United States Patent
Lee

(10) Patent No.: US 10,942,511 B2
(45) Date of Patent: Mar. 9, 2021

(54) ELECTRONIC DEVICE AND CONTROL METHOD THEREOF

(71) Applicant: SAMSUNG ELECTRONICS CO., LTD., Suwon-si (KR)

(72) Inventor: Yong-woo Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 40 days.

(21) Appl. No.: 16/103,041

(22) Filed: Aug. 14, 2018

(65) Prior Publication Data

US 2019/0121352 A1    Apr. 25, 2019

(30) Foreign Application Priority Data

Oct. 25, 2017 (KR) .................. 10-2017-0139271

(51) Int. Cl.
| | |
|---|---|
| G05D 1/00 | (2006.01) |
| G06F 3/0481 | (2013.01) |
| G06F 3/0484 | (2013.01) |
| B64C 39/02 | (2006.01) |

(52) U.S. Cl.
CPC ......... *G05D 1/0016* (2013.01); *B64C 39/024* (2013.01); *G05D 1/0038* (2013.01); *G05D 1/0094* (2013.01); *G06F 3/0484* (2013.01); *G06F 3/04817* (2013.01); *B64C 2201/042* (2013.01); *B64C 2201/127* (2013.01); *B64C 2201/141* (2013.01)

(58) Field of Classification Search
CPC .. G05D 1/0016; G05D 1/0094; G05D 1/0038; B64C 39/024; B64C 2201/127; B64C 2201/042; B64C 2201/141; B64C 2201/12; B64C 2201/146; G06F 3/0484; G06F 3/04817

See application file for complete search history.

(56) References Cited

U.S. PATENT DOCUMENTS

| | | | |
|---|---|---|---|
| 9,586,682 B2 | 3/2017 | Kim et al. | |
| 9,592,911 B2 | 3/2017 | Liu et al. | |
| 9,604,723 B2 | 3/2017 | Liu et al. | |

(Continued)

FOREIGN PATENT DOCUMENTS

| | | |
|---|---|---|
| CN | 105517666 A | 4/2016 |
| CN | 105892472 A | 8/2016 |

(Continued)

OTHER PUBLICATIONS

Search Report dated Oct. 31, 2018, issued by the International Searching Authority in counterpart International Application No. PCT/KR2018/009022 (PCT/ISA/210).

(Continued)

*Primary Examiner* — Michael V Kerrigan
(74) *Attorney, Agent, or Firm* — Sughrue Mion, PLLC

(57) ABSTRACT

Disclosed is an electronic device. The electronic device includes a display and a processor to provide a first UI for setting a reconnaissance target of an unmanned aerial vehicle, and based on the reconnaissance target being selected through the first UI, control the display to provide a second UI for selecting a flight path for reconnoitering the reconnaissance target, and the second UI includes image information regarding each of different flight paths for reconnoitering the reconnaissance target.

17 Claims, 19 Drawing Sheets

(56) References Cited

U.S. PATENT DOCUMENTS

| | | |
|---|---|---|
| 10,029,789 B2 | 7/2018 | Liu et al. |
| 10,421,543 B2 | 9/2019 | Liu et al. |
| 2010/0017114 A1 | 1/2010 | Tehan et al. |
| 2014/0018979 A1 | 1/2014 | Goossen et al. |
| 2015/0316927 A1 | 11/2015 | Kim et al. |
| 2015/0341540 A1 | 11/2015 | Kim et al. |
| 2016/0046374 A1 | 2/2016 | Kugelmass |
| 2016/0068267 A1 | 3/2016 | Liu et al. |
| 2016/0116912 A1 | 4/2016 | Nehmadi et al. |
| 2016/0139596 A1 | 5/2016 | Na et al. |
| 2016/0217698 A1 | 7/2016 | Liu et al. |
| 2016/0241767 A1* | 8/2016 | Cho ................. H04N 5/23203 |
| 2017/0045886 A1 | 2/2017 | Liu et al. |
| 2019/0047700 A1 | 2/2019 | Liu et al. |
| 2020/0010194 A1 | 1/2020 | Liu et al. |

FOREIGN PATENT DOCUMENTS

| | | |
|---|---|---|
| EP | 3 065 042 A2 | 9/2016 |
| JP | 2008-308154 A | 12/2008 |
| JP | 2013-148532 A | 8/2013 |
| KR | 10-2014-0038495 A | 3/2014 |
| KR | 10-1543542 B1 | 8/2015 |
| KR | 10-2015-0100589 A | 9/2015 |
| KR | 10-1564254 B1 | 10/2015 |
| KR | 10-2015-0125174 A | 11/2015 |
| KR | 10-2016-0074896 A | 6/2016 |
| KR | 10-2016-0100188 A | 8/2016 |
| KR | 10-2016-0134334 A | 11/2016 |
| KR | 10-2017-0028114 A | 3/2017 |
| WO | 2017/096547 A1 | 6/2017 |
| WO | 2017/143588 A1 | 8/2017 |

OTHER PUBLICATIONS

Written Opinion dated Oct. 31, 2018, issued by the International Searching Authority in counterpart International Application No. PCT/KR2018/009022 (PCT/ISA/237).

Communication dated Jul. 10, 2020, from the European Patent Office in European Application No. 18871349.9.

Communication dated Dec. 4, 2020, issued by the Chinese Patent Office in counterpart Chinese Application No. 201880068647.4.

* cited by examiner

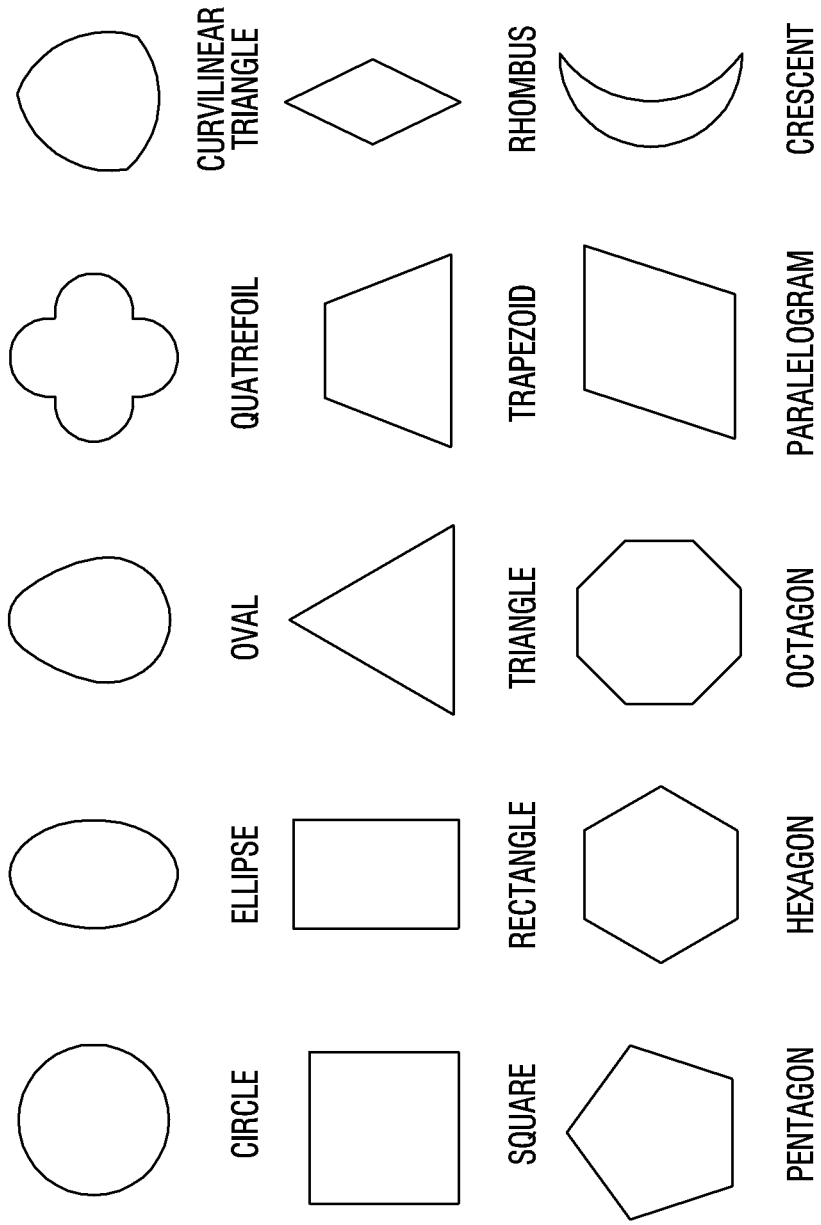

CONE　　　　SQUARE PILLAR　　PRISM HEXAGONAL　　CYLINDER

TRIGONAL PRISM　TRIANGULAR PYRAMID　DODECAHEDRON　　CIRCLE

100

100

100

100

<u>100</u>

100

100

100

100

ELECTRONIC DEVICE AND CONTROL METHOD THEREOF

CROSS-REFERENCE TO RELATED APPLICATIONS

This application is based on and claims priority under 35 U.S.C. § 119 to Korean Patent Application No. 10-2017-0139271, filed in the Korean Intellectual Property Office on Oct. 25, 2017, the disclosure of which is incorporated by reference herein in its entirety.

BACKGROUND

1. Field

Aspects of example embodiments relate generally to an electronic device and a control method thereof and, more particularly, to an electronic device which controls an unmanned aerial vehicle and a control method thereof.

2. Description of Related Art

An unmanned aerial vehicle (UAV) such as drone can be remotely operated without a person riding and is expected to be widely used for military use as well as for commercial use in the private market.

In fact, there are increasing cases of introducing a drone to enhance the security of movie and entertainment shootings and important events. As the drone attracts an attention in the private market, a cheap drone made for personal entertainment and hobbies is also being produced. On the extension of a military drone, a drone can be used in various fields. For example, a drone can be used to manage and monitor specific areas where access of persons is difficult. Specifically, a drone can move freely and quickly, and can monitor a specific area remotely through a mounted camera or sensor. That is, a drone can be used for logistics as well as for public purposes such as victim search, wildfire monitoring, traffic violation control, hunting areas and border area surveillance. A drone may also be used for hobbies such as fishing on the beach.

Notwithstanding the aforementioned diverse uses, there is a problem that no method for setting reconnaissance or surveillance of a drone has been developed.

SUMMARY

An aspect of example embodiments relates to an electronic device which provides a UI for intuitively setting a flight path of an unmanned aerial vehicle and a control method thereof.

According to an example embodiment, an electronic device comprises a display and a processor configured to control the display to provide a first user interface (UI) for setting a reconnaissance target of an unmanned aerial vehicle (UAV), and based on the reconnaissance target being selected through the first UI, control the display to provide a second UI for selecting a flight path for reconnoitering the reconnaissance target, wherein the second UI may include image information regarding each of different flight paths for reconnoitering the reconnaissance target.

The image information may comprise a flight space for reconnoitering the reconnaissance target as a figure of a predetermined shape and the flight path as a directional light in the figure, and the predetermined shape may include at least one of a planar shape and a three-dimensional shape.

The flight path may include a predetermined flight pattern, and the predetermined flight pattern may include at least one of patterns that are vertical in an upward and downward direction, horizontal in a right and left direction, vertical in a zigzag shape, horizontal in a zigzag shape, a border-type, a fixed-type, radial, diagonal, an enlarged circle, a reduced circle, spiral, and a lattice-type.

The processor may provide the second UI that includes information on at least one of a size of the flight space, a shape of the flight space, and a flight path that are recommended based on features of the selected reconnaissance target.

The processor may provide a third UI for setting at least one of a horizontal width, a vertical width, and a height of a flight space for reconnoitering the reconnaissance target, and if a size of the flight space being set through the third UI, provide the second UI which includes information on a shape of the flight space and a flight path that are recommended based on the set size.

The processor may provide a fourth UI for receiving a reconnaissance use of the reconnaissance target, and based on the reconnaissance use being input through the fourth UI, provide the second UI that includes a size of the flight space, a shape of the flight space, and a flight path that are recommended based on the reconnaissance use.

The electronic device may further include a storage storing an application for setting a method of reconnoitering the unmanned aerial vehicle, and the processor may execute the application according to a predetermined event, and provide the first UI and the second UI.

The electronic device may further include a communicator, and the processor may transmit information on the reconnaissance target and the flight path using the first and second UIs to the UAV through the communicator.

According to an example embodiment, a control method of an electronic device includes providing a first UI for setting a reconnaissance target of an unmanned aerial vehicle, and based on the reconnaissance target being selected through the first UI, providing a second UI for selecting a flight path for reconnoitering the reconnaissance target, and the second UI may include image information regarding each of different flight paths for reconnoitering the reconnaissance target.

The image information may comprise the flight space for reconnoitering the reconnaissance target as a figure of a predetermined shape, and provide the flight path as a directional light in the figure, and the predetermined shape may include at least one of a planar shape and a three-dimensional shape.

The flight path may include a predetermined flight pattern, and the predetermined flight pattern may include at least one of patterns that are vertical in an upward and downward direction, horizontal in a right and left direction, vertical in a zigzag shape, horizontal in a zigzag shape, a border-type, a fixed-type, radial, diagonal, an enlarged circle, a reduced circle, spiral, and a lattice-type.

The providing the second UI may include providing the second UI that includes information on at least one of a size of the flight space, a shape of the flight space, and a flight path that are recommended based on features of the selected reconnaissance target.

The method of claim may further include providing a third UI for setting at least one of a horizontal width, a vertical width, and a height of a flight space for reconnoitering the reconnaissance target, and the providing the second UI may include, if a size of the flight space being set through the third UI, providing the second UI which includes information on a shape of the flight space and a flight path that are recommended based on the set size.

The method may further include providing a fourth UI for receiving a reconnaissance use of the reconnaissance target, and the providing the second UI may include, based on the reconnaissance use being input through the fourth UI, providing the second UI that includes a size of the flight space, a shape of the flight space, and a flight path that are recommended based on the reconnaissance use.

The first and second UIs may be provided as an application for setting a reconnaissance method of the UAV is executed.

The method may further include transmitting information on the reconnaissance target and the flight path using the first and second UIs to the UAV through the communicator.

A non-transitory computer-readable medium storing a computer command enabling an electronic device to perform a method when executed by a processor of the electronic device, and the method may include providing a first UI for setting a reconnaissance target of an unmanned aerial vehicle, and, based on a reconnaissance target being selected through the first UI, providing a second UI for setting a flight path to reconnoiter the reconnaissance target, and the second UI may include image information for each of different flight paths to reconnoiter the reconnaissance target.

According to the aforementioned various example embodiments, a user may intuitively set a flight space and a flight path of an unmanned aerial vehicle and thus, user convenience would be improved.

BRIEF DESCRIPTION OF THE DRAWINGS

The above and/or other aspects of the present disclosure will be more apparent from the following detailed description, taken in conjunction with the accompanying drawings, in which like reference numerals refer to like elements, and wherein:

FIGS. 3A, 3B, and 4 are views to describe a method for providing a flight space and a flight path according to an example embodiment.

DETAILED DESCRIPTION

Figure 1:
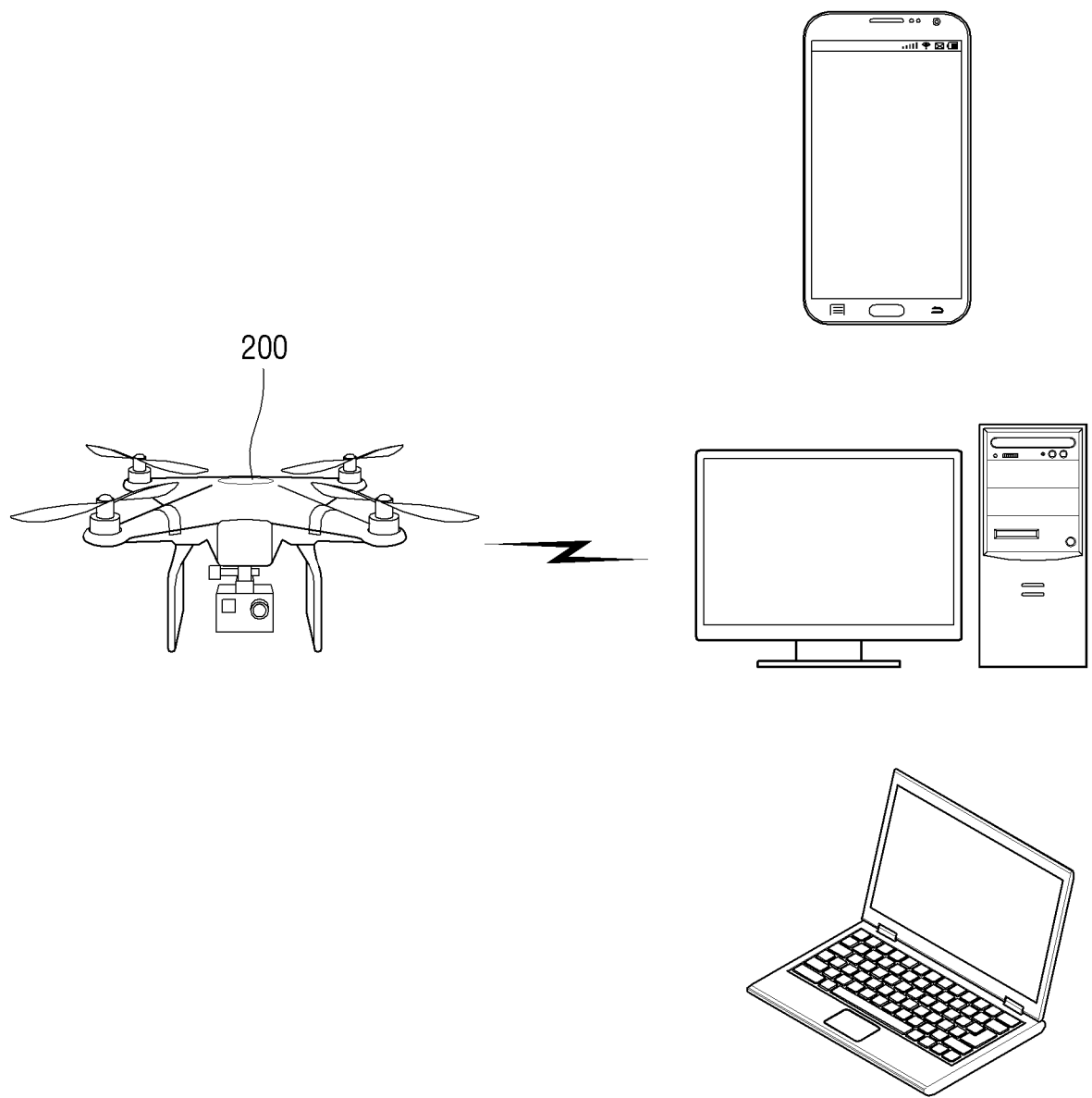
FIG. 1 is a view illustrating a configuration of an electronic system according to an example embodiment.

Certain example embodiments are described in greater detail below with reference to the accompanying drawings.

The terms used in the embodiments of the present disclosure are general terms which are widely used now and selected considering the functions of the present disclosure. However, the terms may vary depending on the intention of a person skilled in the art, a precedent, or the advent of new technology. In addition, in a special case, terms selected by the applicant may be used. In this case, the meaning of the terms will be explained in detail in the corresponding detailed descriptions. Accordingly, defining the terms used herein will be based on the meanings of the terms and overall contents of example embodiments, rather than simple names of the terms.

As embodiments may have a variety of modifications and several examples, certain embodiments will be exemplified in the drawings and described in detail in the description thereof. However, this does not necessarily limit the scope of the embodiments to a specific embodiment form. Instead, modifications, equivalents and replacements included in the disclosed concept and technical scope of this specification may be employed. While describing embodiments, if it is determined that the specific description regarding a known technology obscures the gist of the disclosure, the specific description is omitted.

In the present disclosure, relational terms such as first and second, and the like may be used to distinguish one entity from another entity without necessarily implying any actual relationship or order between such entities.

It is to be understood that the singular forms "a," "an," and "the" include plural referents unless the context clearly dictates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

According to embodiments, a "module" or "unit" performs at least one function or operation, and may be implemented as hardware or software, or a combination of hardware and software. In addition, a plurality of 'modules' or a plurality of 'units' may be integrated into at least one module and may be realized as at least one processor except for 'modules' or 'units' that should be realized in a specific hardware.

Hereinbelow, certain embodiments will now be described in greater detail with reference to the accompanying drawings to enable those skilled in the art to work the same with ease. However, embodiments may be realized in a variety of different configurations, and not limited to descriptions provided herein. Further, those that are irrelevant with the description are omitted so as to describe embodiments more clearly, and similar drawing reference numerals are used for the similar elements throughout the description.

FIG. 1 is a view illustrating a configuration of an electronic system according to an example embodiment.

According to FIG. 1, a remote control system includes an electronic device 100 and an unmanned aerial vehicle (UAV) 200.

The electronic device 100 provides a UI for setting a reconnaissance method of the UAV 200, and can provide a corresponding UI through a predetermined application or a program according to an example embodiment. The electronic device 100 may be implemented as a mobile phone such as a smart phone, but is not limited thereto, and can be implemented as various types of devices having a display function such as a tablet personal computer, a desktop personal computer, a laptop personal computer, a netbook computer, a personal digital assistant (PDA), a portable multimedia player (PMP), an MP3 player, a mobile medical device, a camera, a camcorder, an electronic frame or a wearable device (e.g., a head-mounted devices (HMDs), smart watches, electronic garments, electronic bracelets, electronic necklaces, etc.) and the like. In addition, the display device 100 has a built-in touch screen, and can be implemented to execute an application or a program using a finger or a pen (for example, a stylus pen).

The UAV 200 can be implemented as a small drone or an ultra-small drone. The UAV 200 can be used for the purpose of reconnaissance of (or scanning or monitoring) a patient or an object necessary for the medical industry, cosmetic industry, 3D printing industry, agricultural industry and so on.

The UAV 200 may receive information on the reconnaissance method set in the electronic device 100, and reconnoiter the target based on the information. The UAV 200 can capture an image of a reconnaissance target using a built-in camera and transmit the captured image to the electronic device 100 or an external server (not shown).

The electronic device 100 according to an embodiment of the present disclosure provides recommendation information on a flight space and a flight path for reconnoitering a target in an intuitive image form so that a user can easily set a reconnaissance method. Hereinafter, various UIs provided for setting the reconnaissance method in the electronic device 100 will be described in detail.

Figure 2:
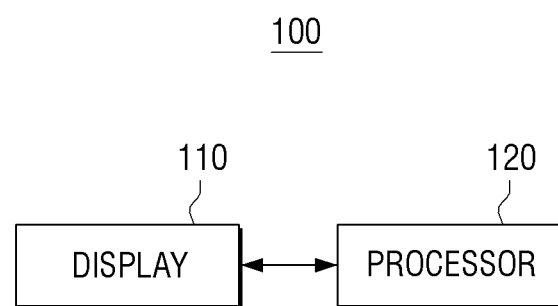
FIG. 2 is a block diagram illustrating a configuration of an electronic device according to an example embodiment.

FIG. 2 is a block diagram illustrating a configuration of an electronic device according to an example embodiment.

According to FIG. 2, the electronic device 100 includes a display 110 and a processor 120.

The display 110 can be implemented as various types such as a liquid crystal display (LCD), organic light-emitting diode (OLED), light-emitting diode (LED), Liquid Crystal on Silicon (LCoS), Digital Light Processing (DLP), quantum dot (QD) display panel, and the like.

The processor 120 controls overall operations of the electronic device 100.

According to one embodiment, the processor 120 may include or be defined as one of a digital signal processor (DSP), a microprocessor, a time controller (TCON), a central processing unit (CPU), a micro controller unit (MCU), micro processing unit (MPU), controller, application processor (AP), or communication processor (CP), and ARM processor. The processor 120 may be implemented as a system on chip (SoC), a large scale integration (LSI), or a field programmable gate array (FPGA) with a processing algorithm embedded therein.

According to an embodiment of the present disclosure, the processor 120 provides a UI for setting a reconnaissance method of the UAV (FIG. 1, 200) according to a predetermined event. According to one example, the UI may be provided by a pre-stored application. However, the present disclosure is not limited thereto, and it may be provided by an external program executed in a pre-stored PC program, an external server, or the like.

The predetermined event may be an event to input a user instruction to select a specific menu, an event to execute a corresponding application, and an event to receive a predetermined signal from the UAV 200 or an external server (not shown).

According to an embodiment, when a UI for setting a reconnaissance method of the UAV 200 is provided through a pre-stored application, an application can be executed based on an event such as an event in which a user instruction for selecting the corresponding application is input, an event in which a predetermined time period nears so that the corresponding application is to be executed, and an event in which a predetermined signal is received from the UAV 200 or an external server (not shown), and a UI can be provided through an application.

According to an embodiment, the processor 120 provides a first UI for setting a reconnaissance object of the UAV on the display 110. Here, the target may be various objects (or object types) such as human, animal, buildings, houses, warehouses, playgrounds, fields, sea, and the like.

In this case, the first UI may provide identification information of various object types in at least one form of text and images so that the user can select various types of objects that can be reconnoitered. However, the present disclosure is not limited thereto, and it is also possible to provide a UI (for example, an input window and a virtual keyboard) through which a user can directly input a type of an object.

According to an example, the processor 120 may provide the first UI based on pre-stored types of various objects. According to another example, the processor 120 may receive the captured image from the UAV 200, identify at least one object in the received image, and provide the first UI including the identified object. According to another example, the processor 120 may identify at least one object based on various sensing data (e.g., optical sensing data) received from the UAV 200, and may include the first UI including the identified object.

According to another embodiment, the processor 120 is capable of automatically setting a reconnaissance target. Specifically, the processor 120 can automatically identify a reconnaissance object based on at least one of the captured image and the sensing data received from the UAV 200. Alternatively, the processor 120 may automatically set a reconnaissance target based on data obtained by using at least one of cameras and various types of sensors provided in the electronic device 100. For example, the processor 120 may identify an object to be reconnoitered by analyzing the captured image obtained through the camera, or may identify an object to be reconnoitered based on the sensing data obtained through an optical sensor. For example, if the reconnaissance target type (e.g., person) is stored in advance, the processor 120 can identify a person as a reconnaissance object when the person is identified in the image acquired through the camera. As another example, if a plurality of objects are identified in the image acquired through the camera, a UI for selecting one of the objects may be provided, or the reconnaissance target may be identified based on a predefined priority. For example, if the priority of the reconnaissance target type is set to "person>building" and the person and the building are all identified on the photographed image, it is also possible to automatically select a person as a reconnaissance target.

The processor 120 may provide a second UI for setting a flight path for reconnoitering a reconnaissance target when a reconnaissance target is selected through the first UI or a reconnaissance target is automatically set. Here, the second UI may include image information for each of different flight paths for reconnoitering a reconnaissance target.

In this case, the image information can provide the flight path to be directional or in a directional line. Here, the recommended flight path may be a pattern among predetermined patterns, and the predetermined patterns may be vertical in an upward and downward direction, horizontal in a right and left direction, vertical in a zigzag shape, horizontal in a zigzag shape, a border-type, a fixed-type, radial, diagonal, an enlarged circle, a reduced circle, spiral, a lattice-type, and a mixed type.

The second UI may also include image information for each of the flight paths for reconnoitering the reconnaissance object and for the different flight paths corresponding to the flight space.

Figure 3B:
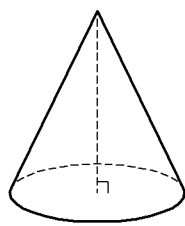
Figure 3B:
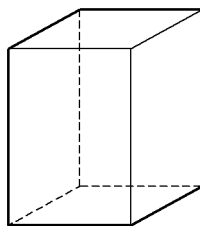
Figure 3B:
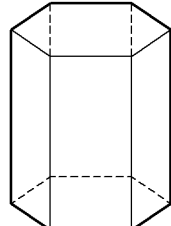
Figure 3B:
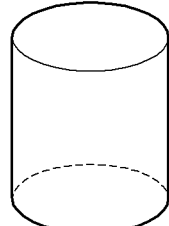
Figure 3B:
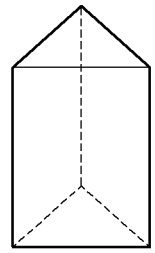
Figure 3B:
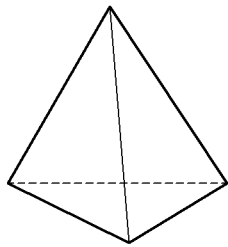
Figure 3B:
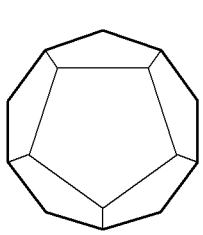
Figure 3B:
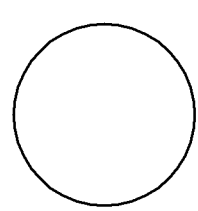
Figure 4:
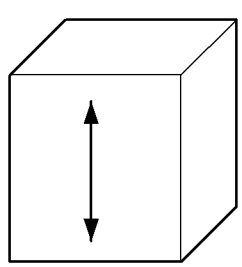
Figure 4:
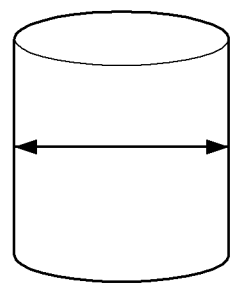
Figure 4:
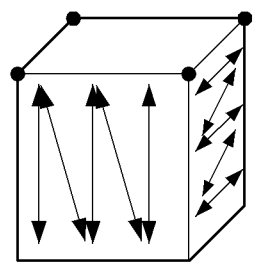
Figure 4:
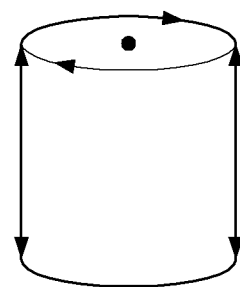
Figure 4:
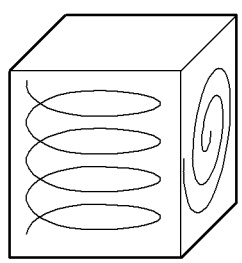
Figure 4:
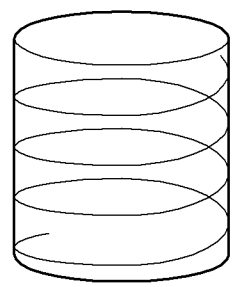
Figure 4:
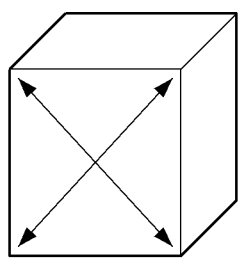
Figure 4:
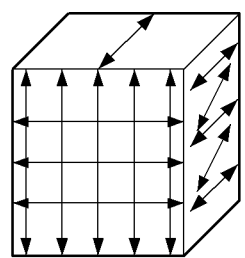

In this case, the image information may provide a flight space for reconnoitering a reconnaissance object as a figure of a predetermined shape, and provide the flight path as a directional line in the figure. The predetermined shape may include at least one of a planar shape and a three-dimensional shape. For example, the predetermined shape may be any shape such as a circle, an ellipse, a hexagon, a rectangle, a square, a cone, an isosceles triangle, an equilateral triangle or the like as shown in FIG. 3A or various polyhedrons and polygons. Also, if a figure representing a flight space and a line representing a flight path are provided together, it may be provided in the form as shown in FIG. 4. For example, if a reconnaissance target is a terrain or a building, a polyhedron or a figure corresponding to the structure of the target, that is, a flight space, may be provided along with the flight path.

Here, a size of the flight space may be automatically input based on a size of the reconnaissance target, or may be input by the user through the third UI described later.

In addition, the second UI may include an image to be reconnoitered (for example, a representative image (symbol image), or an actual captured image). In this case, the image of the reconnaissance target, the image of the flight space, and the image of the flight path are set to be the same proportion on the basis of the actual size of the reconnaissance target, the size of the flight space, and the size of the flight path so that the user can guess the sizes of the flight space and the flight path.

It is also possible that the user directly draws at least one of the flight space and the flight path by drawing with a touch operation. For example, when a predetermined item is selected, the processor 120 may provide a drawing screen in which the user can directly draw the flight space and the flight path by touch input.

In addition, the processor 120 may provide the second UI including information on at least one of a shape of a recommended flight space, a size of the flight space, and a flight path based on the characteristics of the selected reconnaissance target. According to one embodiment, at least one flight path suitable for reconnaissance of a person may be provided and recommended if the reconnaissance target is a moving object, for example, a person. Alternatively, the processor 120 may list and provide at least one flight path suitable for human reconnaissance in order of priority.

According to one embodiment, the processor 120 may recommend at least one of a shape of the flight space, a size of the flight space and a flight path or determine a priority thereof based on preference according to a user (or a plurality of users) selection history, and characteristics analyzed according to a predetermined algorithm, and deep learning by artificial intelligence.

According to another embodiment, the processor 120 may receive information on at least one of a state and a movement of a reconnaissance target sensed through various sensors provided in the UAV 200, and display the received information on the display 110.

The processor 120 may also provide the second UI including information on at least one of the shape of the recommended flight space, the size of the flight space, and the flight path based on at least one of the position and movement of the object to be reconnoitered. For example, when fishing is performed using the UAV 200, it is possible to provide the recommended path of the UAV 200 to obtain a target object based on the state information (for example, size, species, distance, etc.) of the sensed target object which is sensed by the sensor installed in the UAV 200 and movements.

In addition, the processor 120 may provide a third UI for setting at least one of the horizontal width, the vertical width, and the height of the flight space for reconnoitering a reconnaissance target. For example, it is possible to provide a UI capable of setting a flight space with a predetermined unit (at least one of km, m, cm, and mm). The user can set the size of the flight space for reconnoitering the reconnaissance target at regular intervals through the third UI.

According to one embodiment, when the size of the flight space is set through the third UI, the processor 120 may provide the second UI including information on a shape of the recommended flight space and a flight path based on the set size. Alternatively, the processor 120 may provide information on the shape of at least one flight space and a flight path suitable for the set size, in the order of priority.

As such, when the flight space and the flight path are set as described above, the UAV 200 can monitor or reconnoiter a moving object, a person, or an animal while moving in a predetermined pattern form at a predetermined interval.

For example, the UAV 200 can scan a patient or an animal in a predetermined pattern, and can be used for determining and treating an external injury or an internal disease of a patient or an animal. In addition, one or more small UAV 200 can be used to scan an outer surface while maintaining a predetermined distance from the outer surface of the object, that is, a predetermined number of centimeters or a few millimeters, and transmit the information to the 3D printer.

The processor 120 may also provide a fourth UI for receiving a reconnaissance use of the reconnaissance target. In this case, if the reconnaissance use of the reconnaissance target is input through the fourth UI, the processor 120 may provide the second UI including information on at least one of the size of the flight space, the shape of the flight space, and the flight path based on the reconnaissance use. Alternatively, the processor 120 may list and provide at least one of the size of the flight space, the shape of the flight space, and the flight path that are suitable to reconnaissance use in accordance with the priority.

In addition, the processor 120 may provide a UI for setting a reconnaissance time (or a reservation time), a UI for setting a reconnaissance start point and a reconnaissance end point, a UI for setting at least one of the repetition period and the number of times.

FIGS. 5A to 5D are views illustrating an example of a UI that is provided according to an example embodiment.

FIGS. 5A to 5D assume a case of implementing the electronic device 100 as a smartphone for convenient description.

Figure 5A:
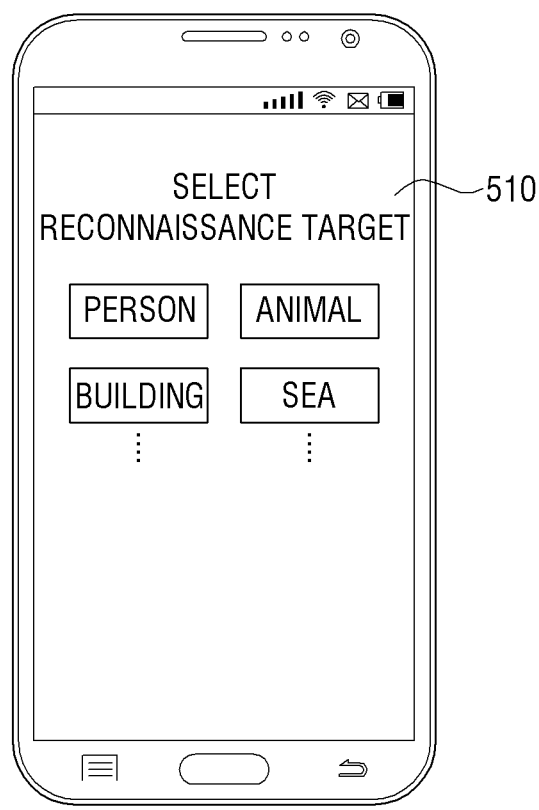
FIGS. 5A to 5E are views illustrating an example of a UI that is provided according to an example embodiment.

When a preset application stored in the electronic device 100 is executed according to an embodiment, a UI 510 for selecting a reconnaissance target as shown in FIG. 5A may be provided. However, identification information of the reconnaissance target may be provided in the form of an image that symbolizes each object, unlike the figure.

Figure 5B:
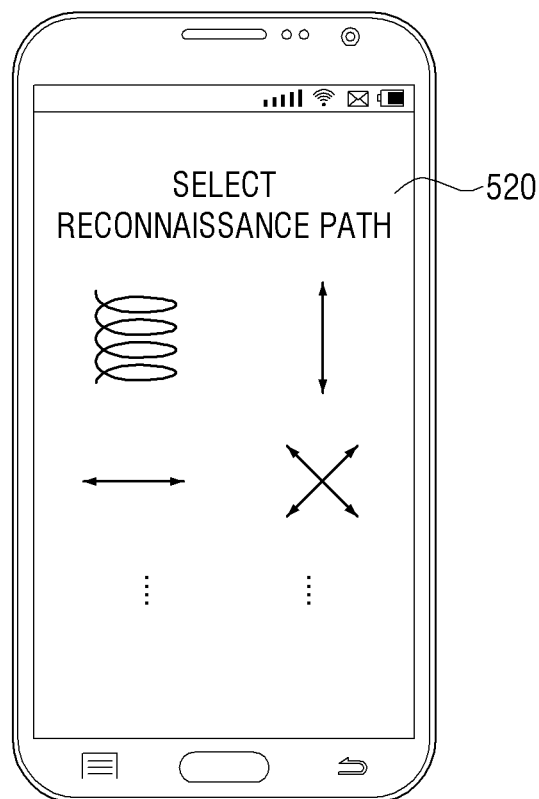

When a reconnaissance object is selected in the UI 510 according to an embodiment, a UI 520 for selecting a flight path for the selected reconnaissance object is provided as shown in FIG. 5B. Here, the flight path may be provided in the form of a line image with or without a direction as illustrated in the figure.

Figure 5C:
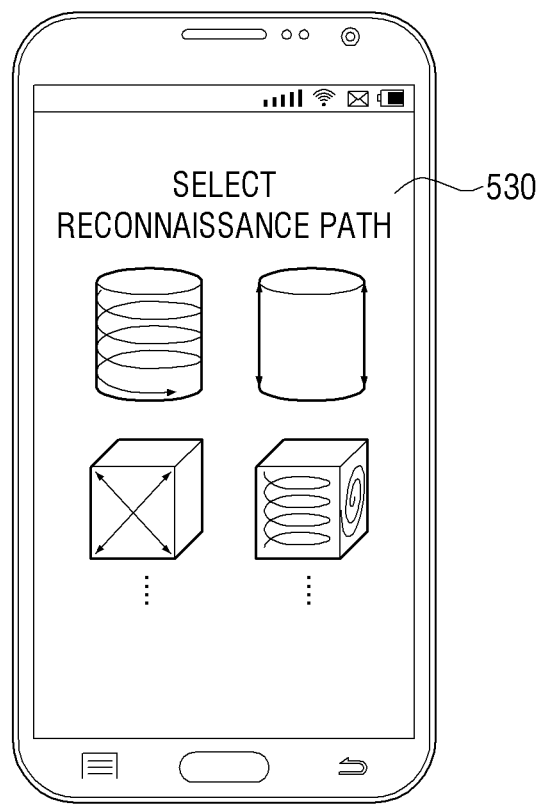

If the reconnaissance target is selected in the UI 510 according to another embodiment, a UI 530 for selecting a flight space and a flight path for the selected reconnaissance target as shown in FIG. 5C can be provided.

As an example, the UI 530 may provide images of various flight spaces and flight paths that can be reconnoitered for selected reconnaissance targets as images.

As another example, the UI 530 may additionally include an image to be reconnoitered. In this case, the image of the reconnaissance target, the image of the flight space, and the image of the flight path are set to be the same proportion on the basis of the actual size of the reconnaissance target, the size of the flight space, and the size of the flight path so that the user can guess the sizes of the flight space and the flight path.

In this case, the actual size of the reconnaissance target can be obtained from prestored information or received information of the actual size which the UAV 200 around the reconnaissance target measures.

According to another embodiment, when a reconnaissance target is selected in the UI 510 and a predetermined figure for selecting a flight space is selected, it is possible to provide a UI (not shown) for selecting a flight path corresponding to the selected flight space.

Figure 5D:
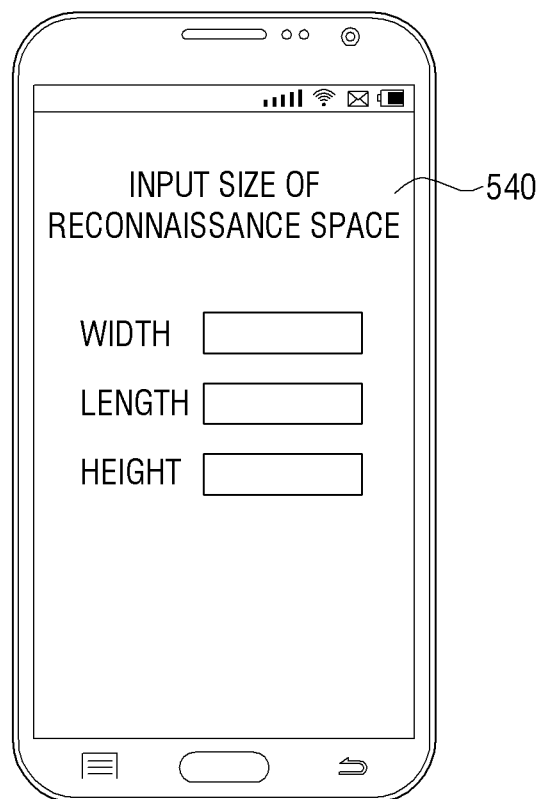
Figure 5E:
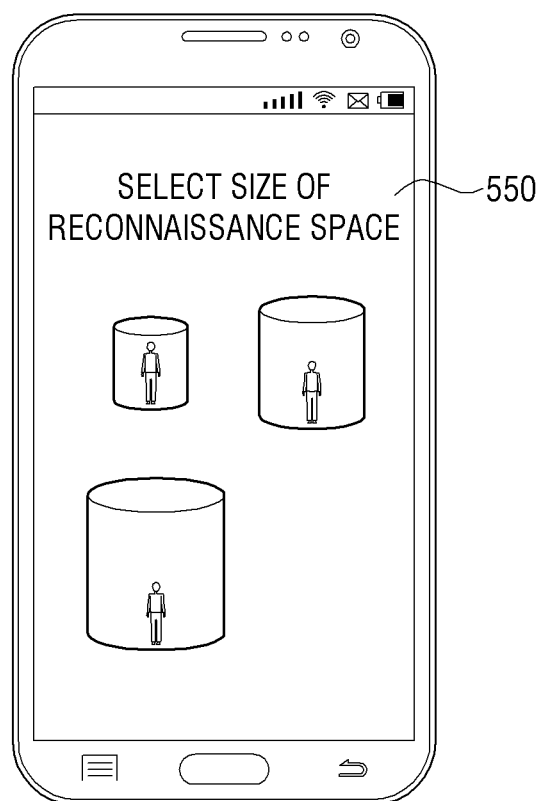

According to an embodiment of the present disclosure, as shown in FIGS. 5D and 5E, a UI 540 or a UI 550 for setting at least one of a width, a length, and a height of a flight space for reconnoitering a reconnaissance target may be provided. Here, the screen of the UI 540 or the UI 550 may be provided before the screen of the UI 520 or the UI 530 is provided, or may be provided after the screen of the UI 520 or the UI 530 is provided.

For example, when the screen of the UI 540 as illustrated in FIG. 5D is provided before the UI 520 or the UI 530 is provided, if a size of the flight space is directly input by a user through the screen of the UI 540, the screen of the UI 530 including a shape of the recommended flight space and a flight path can be provided. Alternatively, it is possible to make a user select various numbers of a width, length, and height.

As another example, the screen of the UI 550 shown in FIG. 5E may be provided after the screen of the UI 520 or the UI 530 is provided. In this case, an actual reconnaissance target (for example, a person) may be displayed so that the user can guess the size of the space, and the information may be provided at a ratio reflecting the size of the space to be actually reconnoitered. It is also possible to additionally provide actual numerical information in the image shown in FIG. 5E.

According to another embodiment, the size of the flight space may be selected in the screen of the UI 530 for selecting a flight path as shown in FIG. 5C. For example, the image of the same flight space and the image of the flight path may be provided in various sizes so that the user can select not only the shape of the flight space and the flight path, but also the size of the flight space at once on the screen of the UI 530.

Figure 6A:
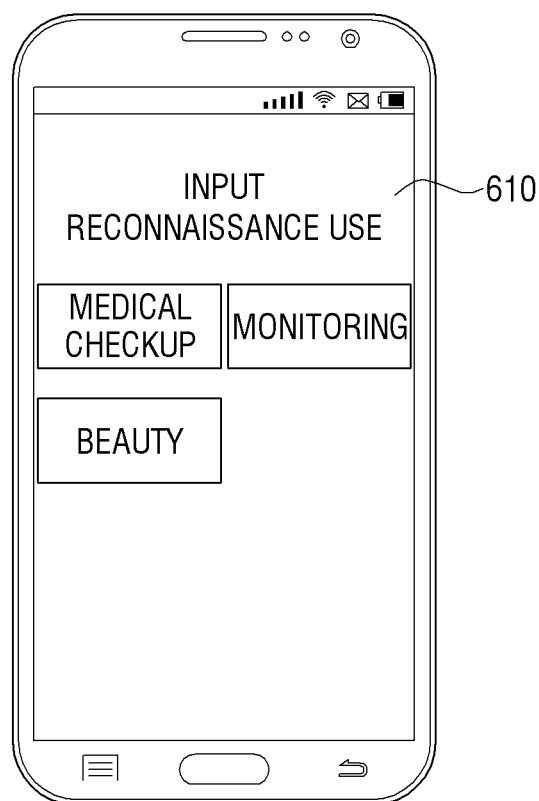
FIGS. 6A and 6B are views illustrating an example of a UI that is provided according to another example embodiment.
Figure 6B:
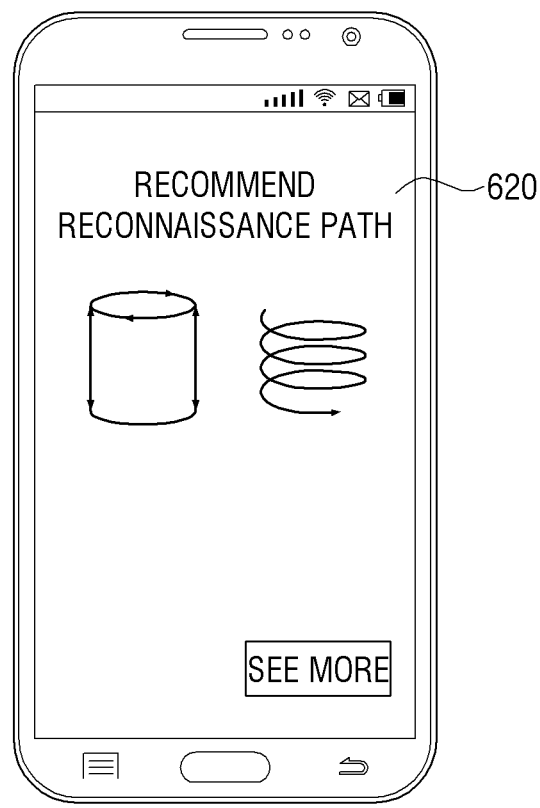

FIGS. 6A and 6B are views illustrating an example of a UI that is provided according to another example embodiment.

If the reconnaissance target is selected according to another embodiment of the present disclosure, a UI for receiving the reconnaissance use may be provided. For example, if a person is selected as a reconnaissance target, a UI 610 for receiving a reconnaissance use of a person as shown in FIG. 6A may be provided. Then, if a specific reconnaissance use is selected on the UI 610, a UI 620 for recommending a flight path suitable for the selected reconnaissance use as shown in FIG. 6B may be provided. In this case, a menu item 621 for providing an additional flight path other than the provided flight path may be provided.

Figure 7A:
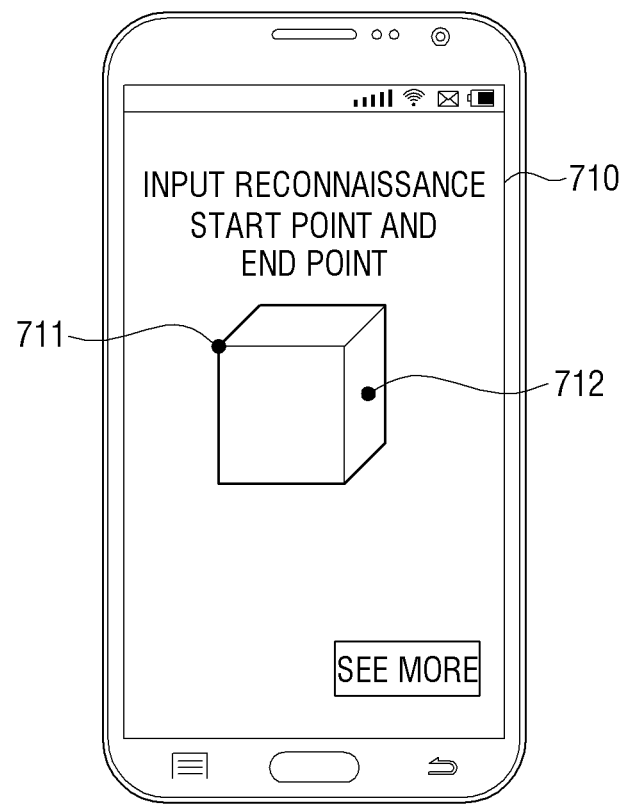
FIGS. 7A and 7B are views illustrating an example of a UI that is provided according to still another example embodiment.
Figure 7B:
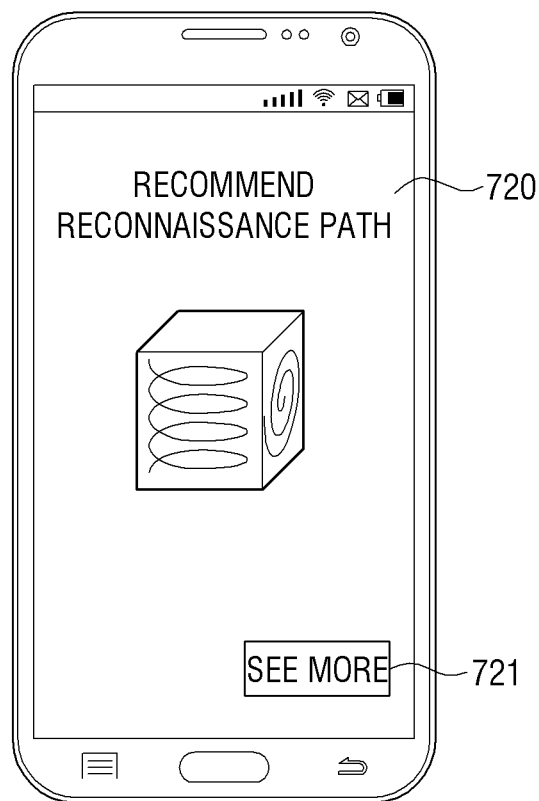

FIGS. 7A and 7B are views illustrating an example of a UI that is provided according to still another example embodiment.

According to another embodiment of the present disclosure, when the shape of the flight space is selected, a UI for receiving a reconnaissance start point and a reconnaissance end point may be provided. For example, when a hexahedral flight space is selected, a UI 710 for receiving a reconnaissance start point and a reconnaissance end point as shown in FIG. 7A may be provided. Then, when the reconnaissance start point 711 and the reconnaissance end point 712 are selected on the UI 710, as illustrated in FIG. 7B, a screen of a UI 720 to recommend a flight path suitable for reconnoitering along with the selected reconnaissance start point 711 and the selected reconnaissance end point 712 can be provided. In this case, a menu item 721 to provide an additional flight path in addition to the provided flight path can be provided.

Figure 8A:
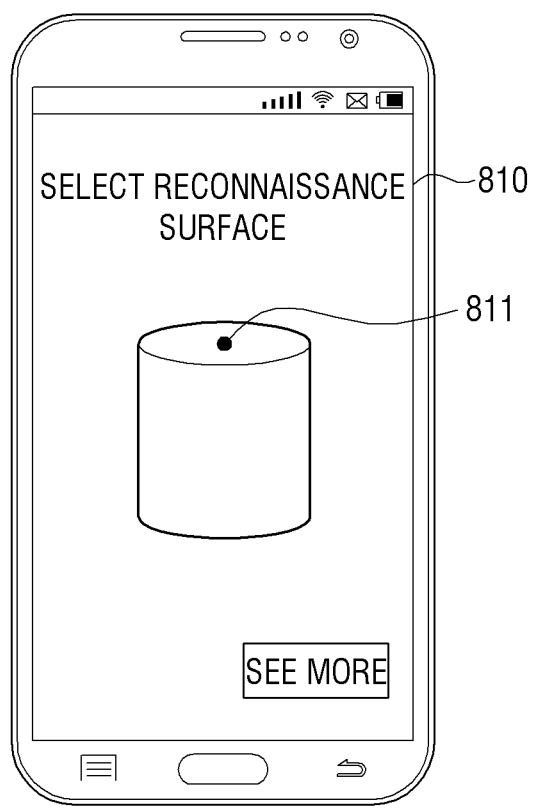
FIGS. 8A and 8B are views illustrating an example of a UI that is provided according to still another example embodiment.
Figure 8B:
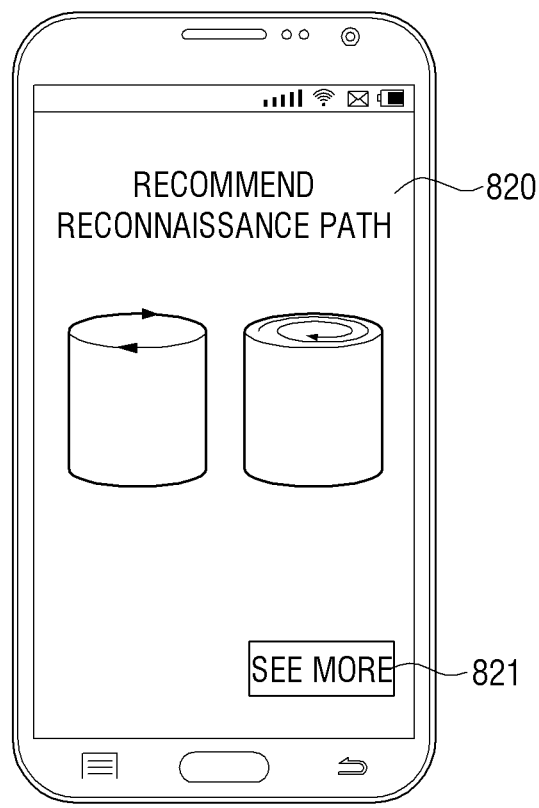

FIGS. 8A and 8B are views illustrating an example of a UI that is provided according to still another example embodiment.

According to another embodiment of the present disclosure, when the shape of the flight space is selected, a UI for receiving the reconnaissance plane may be provided. For example, when a cylindrical space is selected, a UI 810 for receiving a reconnaissance plane as shown in FIG. 8A may be provided. Subsequently, when a reconnaissance plane 811 is selected in the screen of the UI 810, a UI 820 for recommending a flight path suitable for reconnoitering the reconnaissance plane 811 selected as shown in FIG. 8B can be provided. In this case, a menu item 821 for providing an additional flight path other than the provided flight path may be provided.

Figure 9:
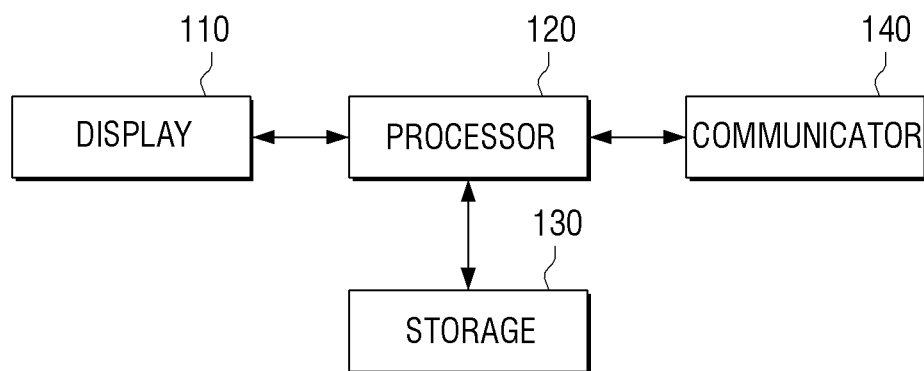
FIG. 9 is a view to describe a detailed configuration of the electronic device of FIG. 2.

FIG. 9 is a view to describe a detailed configuration of the electronic device of FIG. 2.

According to FIG. 9, the electronic device 100 includes the display 110, the processor 120, a storage 130, and a communicator 140. The configuration of FIG. 9 which is overlapped with FIG. 2 will not be further described.

The storage 130 stores various data required for operating the electronic device 100.

In particular, the storage 130 stores data necessary for the processor 120 to execute various processes. For example, the processor 120 may be implemented as an internal memory such as a ROM, a RAM, or the like, or may be implemented as a separate memory from the processor 120. In this case, the storage 130 may be implemented in the form of a memory embedded in the electronic device 100, or a removable memory in the electronic device 100, depending on the purpose of data storage. For example, in the case of data for execution of the electronic device 100, it is stored in a memory embedded in the electronic device 100, and in the case of data for the extended function of the electronic device 100, the data can be stored in detachable memory. The memory embedded in the electronic device 100 may be implemented in the form of a non-transitory memory, a volatile memory, a flash memory, a hard disk drive (HDD), or a solid state drive (SSD), in case of a detachable memory, it can be implemented as a memory card (for example, a micro SD card, a USB memory, etc.), an external memory (for example, a USB memory) connectable to a USB port, and the like.

For example, the storage 130 may store a program for providing a UI for setting a reconnaissance method of an UAV (FIG. 1, 200). For example, the storage 130 may store an application for providing a corresponding UI, that is, an application program. An application is a program that can be provided through a predetermined software platform (or an operating system) supported by the electronic device 100, and can process data such as characters, pictures, or images according to the characteristics of a task for which the program is designed. The application can be implemented to interoperate with other applications as needed.

The processor 120 executes an application stored in the storage 130 according to a predetermined event. Here, the predetermined event may be an event in which a user instruction for selecting a corresponding application is inputted, but the present disclosure is not limited thereto. For example, the processor 120 may execute an application based on an event that a predetermined time period has elapsed for the application to be executed, an event in which a predetermined signal is received from the UAV 200 or an external server (not shown).

The communicator 140 performs communication with the UAV 200. The communicator 140 may communication according to at least one of AP-based Wi-Fi (Wi-Fi, wireless LAN network), Bluetooth, Zigbee, wired/wireless LAN, WAN, Ethernet, and IEEE 1394. Also, the communicator 140 can perform communication with an external server (not shown).

The processor 120 may provide information on the reconnaissance method of the UAV 200 to the electronic device 100 through the communicator 140, using the UI provided according to various example embodiments.

Figure 10:
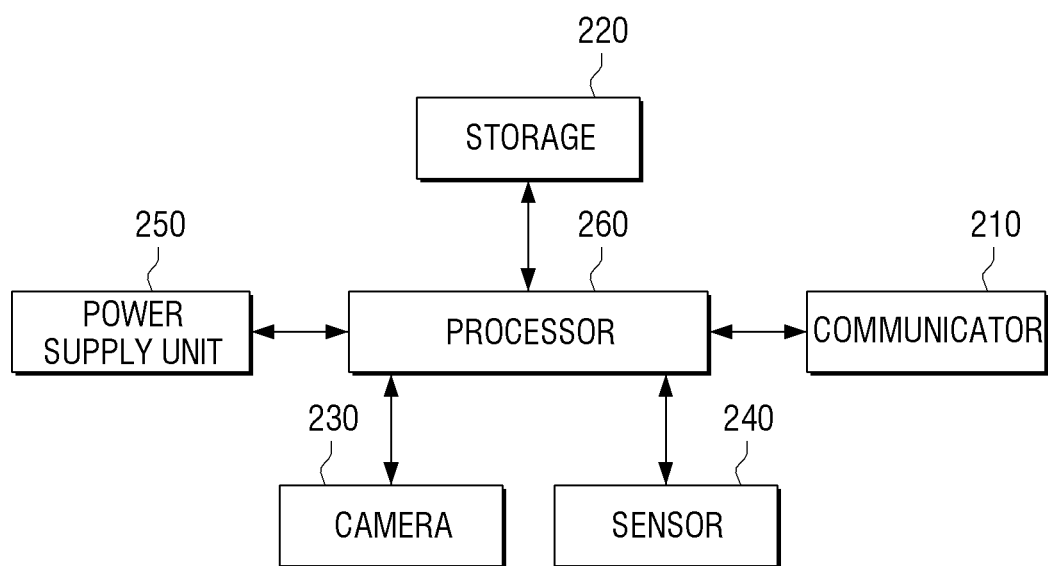
FIG. 10 is a block diagram illustrating a configuration of an unmanned aerial vehicle according to an example embodiment.

FIG. 10 is a block diagram illustrating a configuration of an unmanned aerial vehicle according to an example embodiment.

According to FIG. 10, the UAV 200 includes a communicator 210, a storage 220, a camera 230, a sensor 240, a power supply unit 250, and a processor 260.

The UAV 200 may be implemented as a small drone and an ultra-small drone and so on, but is not limited thereto.

The communicator 210 performs communication with the electronic device 100. The communicator 210 may include at least one of an AP-based Wi-Fi (Wi-Fi), Bluetooth, Zigbee, wired LAN, WAN, Ethernet, and IEEE 1394. The communication can be performed according to one communication method. Also, the communicator 210 can perform communication with an external server (not shown).

The storage 220 stores various data which is required for operating the UAV 200.

For example, the storage 220 may store an application, a program, software, and so on to receive and process information on the reconnaissance method provided from the electronic device 100, for example, the size of the flight space, the flight path, the flight time, the starting point of the flight.

The camera 230 is activated according to a predetermined event and photographs external environment. For example, the camera 230 may be activated as the predetermined application is executed.

The sensor 240 may include one or more sensors for sensing at least one of the information in the UAV 200, the environment information of the UAV 200, and the user information. For example, the sensor 240 may be a proximity sensor, an illuminance sensor, a touch sensor, an acceleration sensor, a magnetic sensor, a gravity sensor, a gyroscope sensor, a motion sensor, an RGB sensor, an infrared sensor, a fingerprint sensor, a microphone, a fuel gauge, an environmental sensor, and a chemical sensor.

The power supply unit 250 receives an external power supply and internal power supply under the control of the processor 260 and supplies power required for operation of the respective components. The power supply unit 250 may include a battery, and the battery may be a built-in battery that can be charged, and may be detachably coupled to the body for charging or the like. The battery may be configured to receive power through a power cable. The battery may also be configured to be wirelessly chargeable through a wireless charging device.

The processor 260 controls overall operations of the UAV 200. The processor 260 can be embodied as a type which is the same as or similar to the processor 120 of the electronic device 100.

According to one embodiment, the processor 260 executes a pre-stored application in accordance with a control signal received from the electronic device 100, and analyzes various information related to the reconnaissance method received from the electronic device 100 through an application, and controls the flight state of the UAV 200 based on the analyzed information.

For example, when the reconnaissance target received from the electronic device 100 is a moving person, the UAV 200 can acquire information about the flight space, for example, the shape and length of the flight space, and the flying path, reconnoiter the moving person based on the width, length, height, and flight pattern. For example, it is possible to determine the approximate position of a person based on the GPS information of a terminal held by the person, and to identify the movement using infrared rays or the like near the person, reconnoitering the moving person according to the received flight pattern.

The processor 260 may capture at least one of a still image and a moving image while reconnoitering the target to be reconnoitered, perform audio recording or the like to acquire the reconnoitering data, and transmit the obtained reconnoitering data to the electronic device 100.

According to another embodiment, when an event such as an invasion of a flight space occurs, the processor 260 may capture or film an object or an invading object using the camera 230, and transmit information of the object to at least of the electronic device 100 and the external server. Alternatively, it is possible to contact a pre-stored telephone number (for example, 119 for urgent response). In addition, when the UAV 200 is utilized in the medical or cosmetic industry, the position, area size, and predicted disease name of the patient may be diagnosed and transmitted to the electronic device 100, or an external server.

Figure 11:
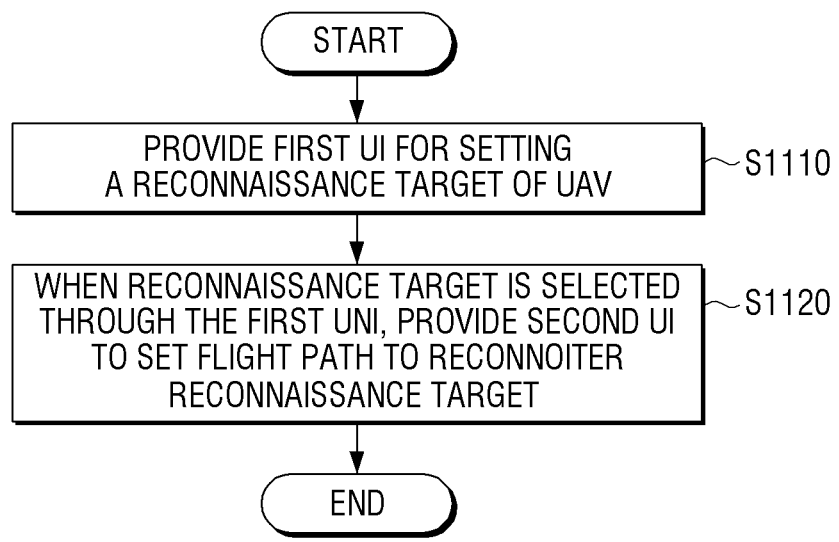
FIG. 11 is a flowchart to describe a control method of an electronic device according to an example embodiment.

FIG. 11 is a flowchart to describe a control method of an electronic device according to an example embodiment.

According to the control method of the electronic device shown in FIG. 11, first, a first UI for setting a reconnaissance target of the unmanned airplane is provided in step S1110.

If a reconnaissance target is selected through the first UI, a second UI for setting a flight path for reconnaissance is provided in step S1120. Here, the second UI may include image information for each of different flight paths for reconnoitering a reconnaissance target.

In this case, the image information may provide a flight space for reconnoitering a reconnaissance target as a figure of a predetermined shape, and provide a flight path as a directional line in the figure. Here, the predetermined shape may include at least one of a planar shape and a three-dimensional shape.

The flight path may include at least one of paths that are vertical in an upward and downward direction, horizontal in a right and left direction, vertical in a zigzag shape, horizontal in a zigzag shape, a border-type, fixed-type, radial, diagonal, an enlarged circle, a reduced circle, spiral, and a lattice-type.

Also, the second UI may include an image to be reconnoitered, and provide the image of the target to be reconnoitered, the image of the flight space, and the image of the flight path as the same proportion based on the actual size of the reconnaissance target, the size of the flight space.

In addition, the step S1120 of providing the second UI may include providing the second UI including information on at least one of a size of the flight space, a shape of the flight space, and a flight path that are recommended based on reconnaissance use based on the features of the selected reconnaissance target.

The control method may further include providing a third UI for setting at least one of a horizontal width, a vertical width, and a height of a flight space for reconnoitering a reconnaissance target. In this case, if the size of the flight space is set through the third UI, the step of providing the second UI may include providing the second UI which includes information on a shape of the flight space and a flight path that are recommended based on the set size.

Further, the control method may further include providing a fourth UI for receiving a reconnaissance use of the target to be reconnoitered. In this case, the step S1120 of providing the second UI may include providing the second UI which includes information, when the reconnaissance use is input through the fourth UI, regarding a size of the flight space, a shape of the flight space, and a flight path that are recommended based on the reconnaissance use.

In addition, the control method may further include transmitting information on the reconnaissance target and the flight path to the UAV using the first and second UIs.

According to the various embodiments described above, a user can intuitively set the flight space, the flight path, etc. of the UAV and thus, user convenience can be improved.

In the meantime, at least a part of the methods according to various example embodiments can be implemented as an application that is installable in the conventional electronic device.

In addition, at least a part of the methods according to various example embodiments can be implemented only with software upgrade or hardware upgrade of the conventional electronic device.

In addition, at least a part of the various example embodiments can be performed through an embedded server that is provided on the electronic device or an external server of the electronic device.

Meanwhile, at least some of the various example embodiments described above may be implemented in a recording medium that can be read by a computer or similar device using software, hardware, or a combination thereof. In some cases, at least some of the embodiments described herein may be implemented by the processor itself. According to a software implementation, at least some of the embodiments, such as the procedures and functions described herein, may be implemented with separate software modules. Each of the software modules may perform one or more of the functions and operations described herein.

Meanwhile, computer instructions for performing the processing operations of an electronic device according to various embodiments of the present disclosure described above may be stored in a non-transitory computer-readable medium. The computer instructions stored in the non-transitory computer-readable medium cause the particular device to perform the processing operations in the electronic device according to the various embodiments described above when executed by the processor of the particular device.

The non-transitory computer readable medium refers to a medium that stores data semi-permanently, and is readable by an apparatus. Specifically, the above-described various applications or programs may be stored in the non-transitory computer readable medium such as a compact disc (CD), a digital versatile disk (DVD), a hard disk, a Blu-ray disk, a universal serial bus (USB), a memory card, a ROM or etc., and may be provided.

The foregoing example embodiments and advantages are merely examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. An electronic device comprising:
a display; and
a processor configured to:
control the display to provide a first user interface (UI) for setting a reconnaissance target of an unmanned aerial vehicle (UAV), and
based on the reconnaissance target being selected through the first UI, control the display to provide a second UI for selecting a flight path for reconnoitering the reconnaissance target,
wherein the second UI comprises a plurality of images corresponding to a plurality of different flight paths for reconnoitering the reconnaissance target,
wherein each of the plurality of images comprises a flight space for reconnoitering the reconnaissance target represented as a figure of a predetermined shape and each of the plurality of different flight paths is represented as a directional line in the figure,
wherein the predetermined shape comprises a three-dimensional shape, and
wherein the flight space indicates a movement range of the UAV in which the UAV moves according to a control of the electronic device.

2. The electronic device of claim 1, wherein each of the plurality of different flight paths comprises a predetermined flight pattern, and
wherein the predetermined flight pattern comprises a pattern that is vertical in an upward and downward direction with respect to a fixed reconnaissance target, a pattern that is horizontal in a right and left direction with respect to a fixed reconnaissance target, a pattern that is vertical in a zigzag shape, a pattern that is horizontal in a zigzag shape, a pattern that is a border-type that traces a volumetric extent of the flight space, a pattern that is a fixed-type that remains at one point, a pattern that is a radial that traces a volumetric extent of the flight space, a pattern that is diagonal with respect to a fixed reconnaissance target, a pattern that is an enlarged circle that is larger than the reconnaissance target, a pattern that is a reduced circle that is smaller than the reconnaissance target, a pattern that is a spiral, and a pattern that is a lattice-type.

3. The electronic device of claim 1, wherein the second UI comprises an image of the reconnaissance target,
wherein the processor is configured to control the display to provide the image of the reconnaissance target to be reconnoitered, an image of the flight space, and an image of the flight path as the same proportion based on an actual size of the reconnaissance target, an actual size of the flight space, and an actual size of the flight path.

4. The electronic device of claim 1, wherein the processor is configured to control the display to provide the second UI that includes information on at least one of a size of the flight space, a shape of the flight space, and a recommended flight path each of which is recommended based on features of the selected reconnaissance target.

5. The electronic device of claim 1, wherein the processor is configured to:
control the display to provide a third UI for setting at least one of a horizontal width of the flight space, a vertical width of the flight space, and a height of the flight space for reconnoitering the reconnaissance target, and
based further on a size of the flight space being set through the third UI, control the display to provide the second UI which includes information on a shape of the flight space and a flight path that are recommended based on the set size of the flight space.

6. The electronic device of claim 1, wherein the processor is configured to:
control the display to provide a fourth UI for receiving a reconnaissance use of the reconnaissance target, and
based further on the reconnaissance use being input through the fourth UI, control the display to provide the second UI that includes a size of the flight space, a shape of the flight space and a recommended flight path each of which is recommended based on the reconnaissance use.

7. The electronic device of claim 1,
wherein the processor is configured to provide the first UI according to a predetermined event.

8. The electronic device of claim 1,
wherein the processor is configured to transmit information regarding the reconnaissance target and the flight path selected using the first and second UIs to the UAV.

9. A control method of an electronic device, the method comprising:
providing a first user interface (UI) for setting a reconnaissance target of an unmanned aerial vehicle (UAV); and
based on the reconnaissance target being selected through the first UI, providing a second UI for selecting a flight path for reconnoitering the reconnaissance target,
wherein the second UI comprises a plurality of images corresponding to a plurality of different flight paths for reconnoitering the reconnaissance target,
wherein each of the plurality of images comprises a flight space for reconnoitering the reconnaissance target represented as a figure of a predetermined shape and each of the plurality of different flight paths is represented as a directional line in the figure,
wherein the predetermined shape comprises a three-dimensional shape, and
wherein the flight space indicates a movement range of the UAV in which the UAV moves according to a control of the electronic device.

10. The method of claim 9, wherein each of the plurality of different flight paths comprises a predetermined flight pattern, and
wherein the predetermined flight pattern comprises a pattern that is vertical in an upward and downward direction with respect to a fixed reconnaissance target, a pattern that is horizontal in a right and left direction with respect to a fixed reconnaissance target, a pattern that is vertical in a zigzag shape, a pattern that is horizontal in a zigzag shape, a pattern that is a border-type that traces a volumetric extent of the flight space, a pattern that is a fixed-type that remains at one point, a pattern that is a radial that traces a volumetric extent of the flight space, a pattern that is diagonal with respect to a fixed reconnaissance target, a pattern that is an enlarged circle that is larger than the reconnaissance target, a pattern that is a reduced circle that is smaller than the reconnaissance target, a pattern that is a spiral, and a pattern that is a lattice-type.

11. The method of claim 9, wherein the second UI comprises an image of the reconnaissance target,
wherein the providing the second UI comprises providing the second UI that includes the image of the target to be reconnoitered, an image of the flight space, and an image of the flight path as the same proportion based on an actual size of the reconnaissance target, an actual size of the flight space, and an actual size of the flight path.

12. The method of claim 9, wherein the providing the second UI comprises providing the second UI that includes information on at least one of a size of the flight space, a shape of the flight space, and a recommended flight path each of which is recommended based on features of the selected reconnaissance target.

13. The method of claim 9, further comprising: providing a third UI for setting at least one of a horizontal width of the flight space, a vertical width of the flight space, and a height of the flight space for reconnoitering the reconnaissance target,
wherein the providing the second UI comprises, if a size of the flight space is further set through the third UI, providing the second UI which includes information on a shape of the flight space and a flight path that are recommended based on the set size of the flight space.

14. The method of claim 9, further comprising:
providing a fourth UI for receiving a reconnaissance use of the reconnaissance target,
wherein the providing the second UI comprises, based further on the reconnaissance use being input through the fourth UI, providing the second UI that includes a size of the flight space, a shape of the flight space, and a recommended flight path each of which is recommended based on the reconnaissance use.

15. The method of claim 9, wherein the first UI is provided in response to a predetermined event.

16. The method of claim 9, further comprising:
transmitting information regarding the reconnaissance target and the flight path selected using the first and second UIs to the UAV.

17. A non-transitory computer-readable medium storing a computer command enabling an electronic device to perform a method when executed by a processor of the electronic device,
wherein the method comprises:
providing a first user interface (UI) for setting a reconnaissance target of an unmanned aerial vehicle (UAV), and
based on a reconnaissance target being selected through the first UI, providing a second UI for setting a flight path to reconnoiter the reconnaissance target,
wherein the second UI comprises a plurality of images corresponding to a plurality of different flight paths to reconnoiter the reconnaissance target, wherein each of the plurality of images comprises a flight space for reconnoitering the reconnaissance target represented as a figure of a predetermined shape and each of the plurality of different flight paths is represented as a directional line in the figure, and wherein the predetermined shape comprises a three-dimensional shape, wherein the flight space indicates a movement range of the UAV in which the UAV moves according to a control of the electronic device.

* * * * *